United States Patent [19]

Linde

[11] Patent Number: 4,555,061

[45] Date of Patent: Nov. 26, 1985

[54] MANURE SPREADER EXPELLER FLAIL

[75] Inventor: Gilbert W. Linde, Oxford, Pa.

[73] Assignee: Sperry Corporation, New Holland, Pa.

[21] Appl. No.: 531,116

[22] Filed: Sep. 12, 1983

[51] Int. Cl.[4] ............................................. A01C 15/16
[52] U.S. Cl. .................................... 239/675; 239/680; 241/292.1
[58] Field of Search .............. 239/658, 664, 671, 672, 239/675, 681; 172/45, 91, 119, 113, 123; 241/292.1

[56] References Cited

U.S. PATENT DOCUMENTS

| | | |
|---|---|---|
| 2,841,946 | 7/1958 | Skromme et al. |
| 3,025,067 | 3/1962 | Raney et al. ........................ 239/658 |
| 3,035,393 | 5/1962 | Mathews. |
| 3,228,701 | 1/1966 | Smith et al. .......................... 239/681 |
| 3,295,855 | 1/1967 | Sadler ................................... 239/681 |
| 3,722,802 | 3/1973 | Kreienbaum ........................ 239/658 |
| 4,069,982 | 1/1978 | Brackbill ............................. 239/679 |
| 4,362,272 | 12/1982 | Martin .................................. 239/675 |
| 4,473,184 | 9/1984 | Martin .................................. 239/675 |

Primary Examiner—Jeffrey V. Nase
Assistant Examiner—Michael J. Forman
Attorney, Agent, or Firm—Darrell F. Marquette; Frank A. Seemar; Larry W. Miller

[57] ABSTRACT

In a manure spreader of the slurry type, an expeller device includes blades which each have a planar portion canted or angled in the same direction to cause the expeller device to discharge manure in a lateral and rearward direction with respect to the direction of travel of the manure spreader.

1 Claim, 9 Drawing Figures

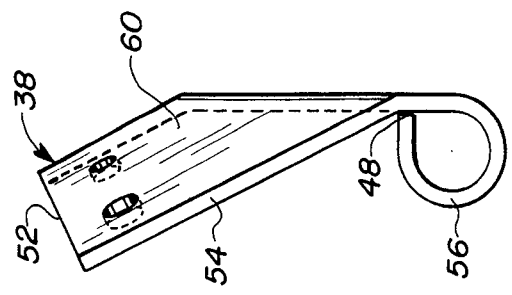
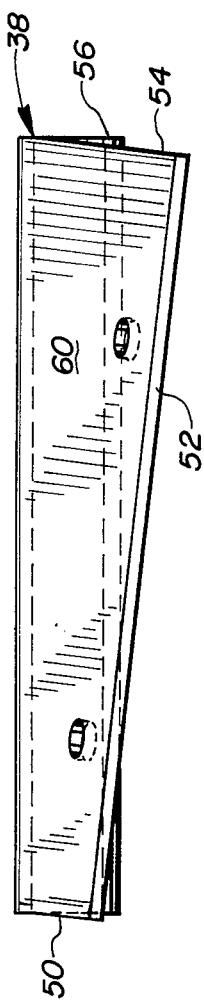
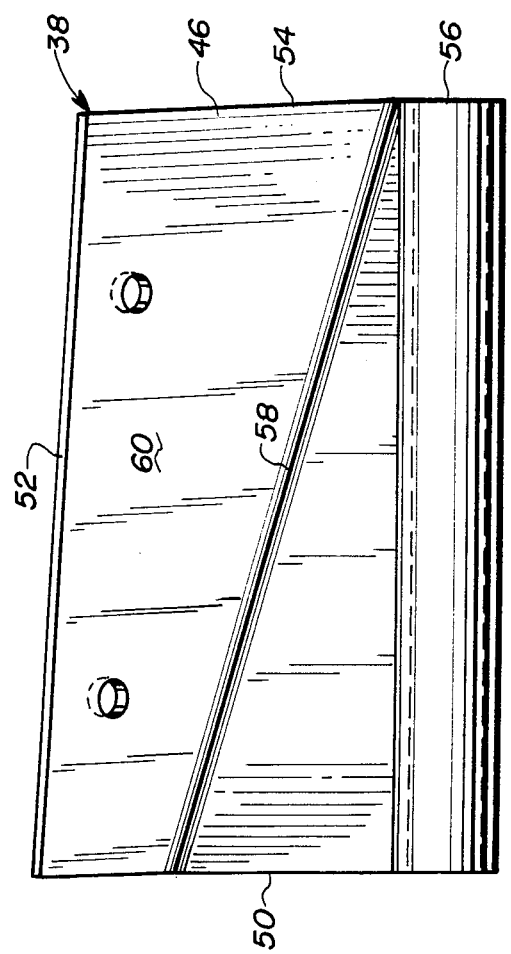

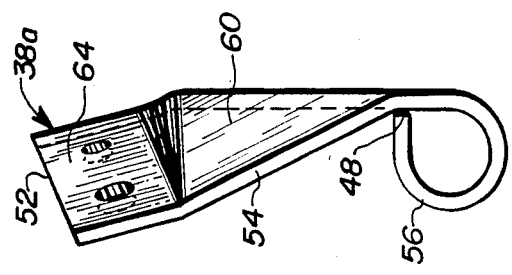
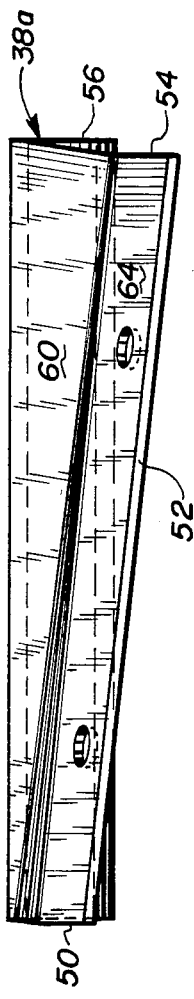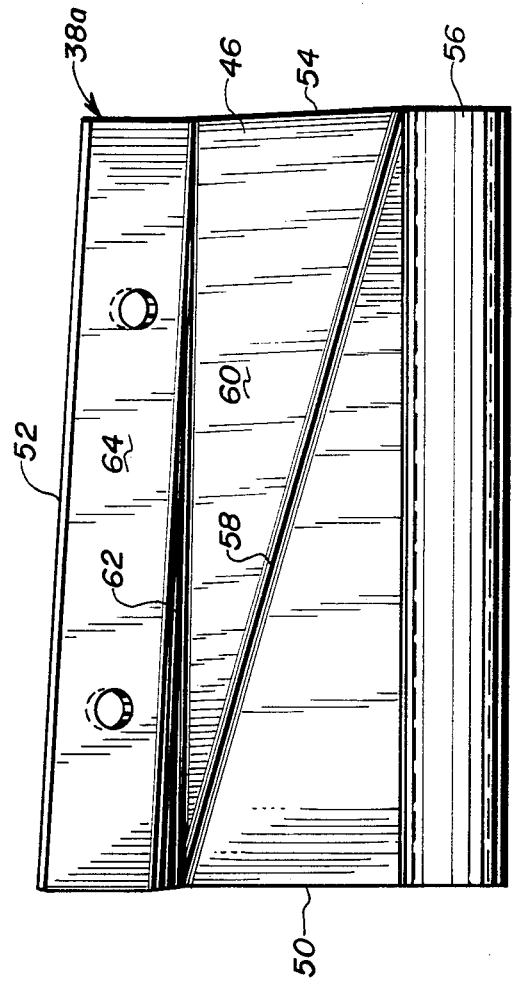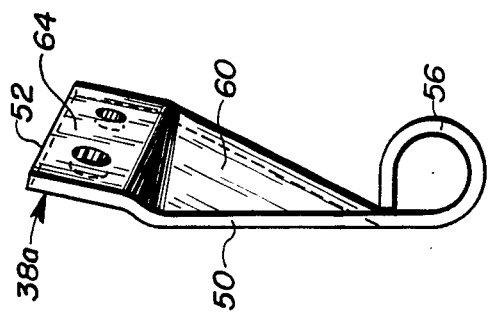

MANURE SPREADER EXPELLER FLAIL

BACKGROUND AND SUMMARY OF THE INVENTION

Manure spreaders of the slurry type, such as disclosed in U.S. Pat. No. 4,362,272, generally include a tank for containing manure with an auger rotatably mounted in the tank near the bottom thereof. The auger has flighting or paddles arranged to move manure toward an opening formed in a sidewall of the tank. An expeller device is provided at the opening to discharge manure generally in a lateral direction away from the spreader.

According to the present invention, the expeller device includes a plurality of blades connected to and rotatable about a central shaft. Each of the blades has a planar portion which is canted in the same direction relative to the longitudinal axis of the central shaft. This orientation of the blades causes the expeller device to actually throw manure in a somewhat lateral and rearward direction with respect to the direction of travel of the spreader.

DESCRIPTION OF THE DRAWINGS

FIG. 3 is a side elevation view of one of the expeller blades shown in FIGS. 1 and 2;

FIG. 4 is a top view of the expeller blade of FIG. 3;

FIG. 5 is a right end view of the expeller blade of FIG. 3;

FIG. 6 is a side elevation view of another embodiment of the expeller blade shown in FIGS. 1 and 2;

FIG. 7 is a left end view of the expeller blade of FIG. 6;

FIG. 8 is a top view of the expeller blade of FIG. 6; and

FIG. 9 is a right end view of the expeller blade of FIG. 6.

DESCRIPTION OF THE PREFERRED EMBODIMENT

Figure 1:
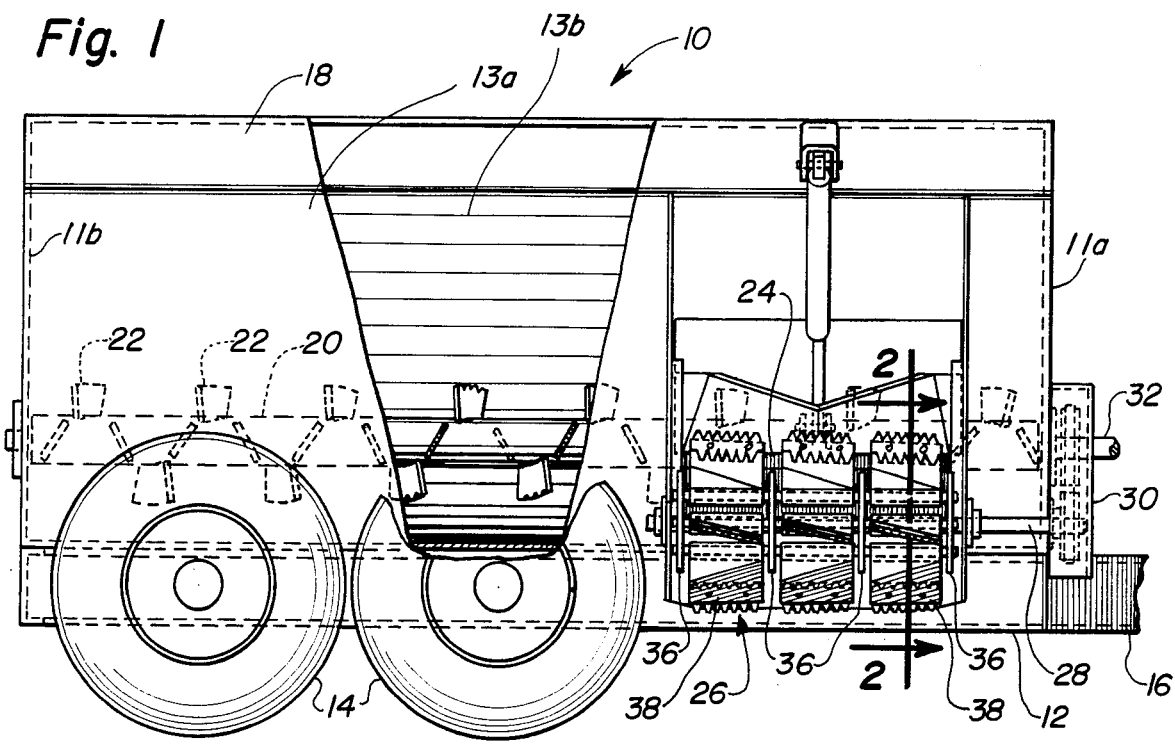
FIG. 1 is a side elevation view, with portions broken away, of a manure spreader incorporating the expeller of the present invention.

A slurry type manure spreader 10 shown in FIG. 1 includes a base frame 12 supported by wheels 14. A tongue 16 is fixed to the base frame 12 at the forward end of the spreader 10 and is adapted for connection to a towing vehicle such as a tractor (not shown). A tank 18 for containing manure is mounted on the base frame 12, and an auger 20 is rotatably mounted in the tank 18 near the bottom thereof. The tank 18 includes front and rear end walls 11a and 11b, respectively, and sidewalls 13a, 13b. The auger 20 has paddles 22 arranged to move manure toward an opening 24 formed in side wall 13a of the tank 18. An expeller device 26 is provided at the opening 24 to discharge manure generally in a lateral direction away from the spreader 10. The expeller device 26 includes a central shaft 28 which is rotated via a chain and sprocket arrangement 30 from the axial shaft 32 of the auger 20.

Figure 2:
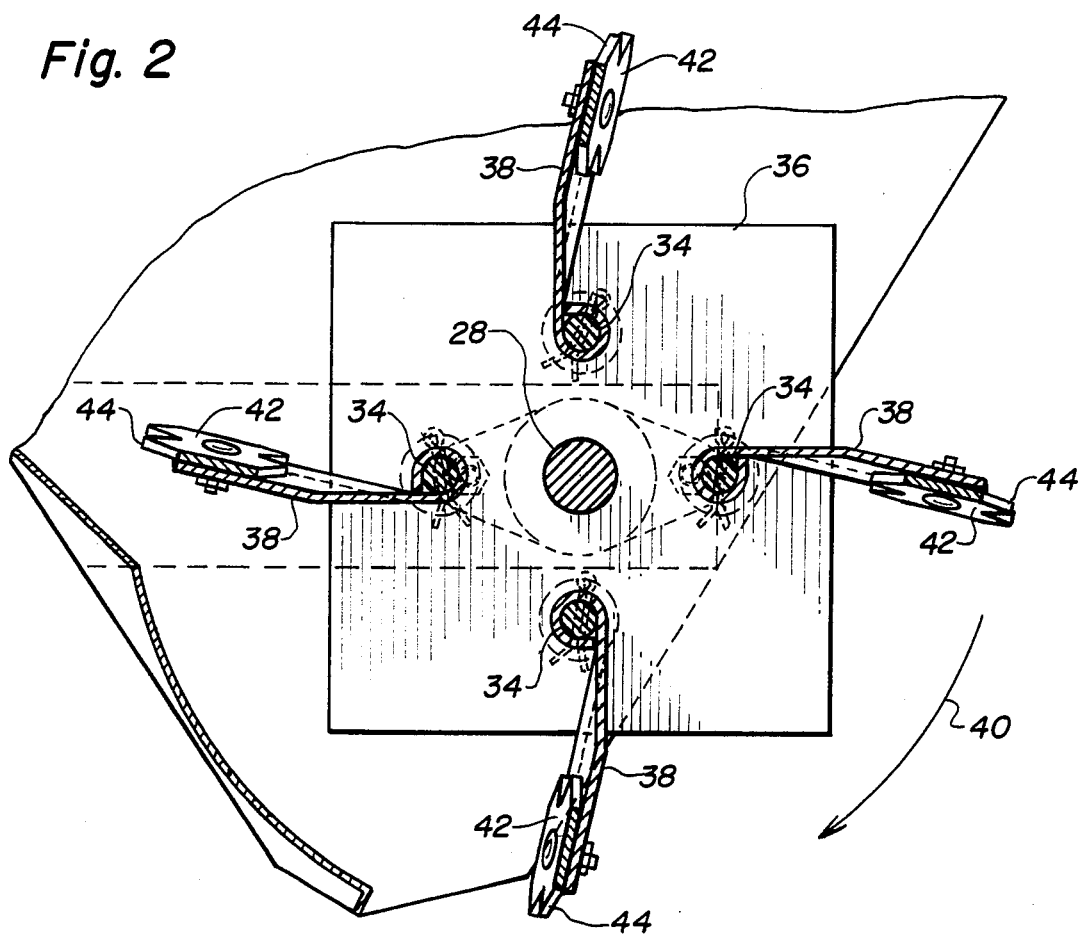
FIG. 2 is an enlarged sectional view taken along lines 2—2 in FIG. 1.

Referring now also to FIG. 2, the expeller device 26 consists of four outer shafts 34 connected by plates 36 to be rotated with the central shaft 28. Blades 38 are provided on the outer shafts 34 for rotation in the path and direction indicated by the arrow 40. The blades 38 are pivoted at one end on the outer shafts 34, and, preferably, three blades are mounted side-by-side on each outer shaft 34 thus making a total of twelve blades. An edge member 42 having a plurality of teeth 44 is secured such as by bolts to the free end of each flail 38.

As best seen in FIGS. 3–5, each blade 38 is preferably formed from a substantially rectangular sheet of metal 46 which has edges 48, 50, 52, 54. Each blade 38 is curled adjacent the edge 48 to form a tubular portion 56 for receiving one of the shafts 34. Each blade 38 is also bent diagonally along a generally straight line 58 to provide a planar portion 60 that is canted or angled relative to the longitudinal axis of the tubular portion 56.

All of the blades 36 are mounted on the shafts 34 with their edges 50 facing toward the rear wall 11b of the spreader 10 and with their edges 54 facing toward the front of the spreader 10. Therefore, all of the planar portions 60 of the blades 38 are canted or angled in the same direction relative to the axis of the central shaft 28 of the expeller device 26. This orientation of the blades 36 causes the expeller device 26 to actually throw manure in a somewhat lateral and rearward direction with respect to the direction of travel of the spreader 10. The manure is thus thrown clearly away from the vehicle towing the spreader 10.

An alternative blade 38a, shown in FIGS. 6–9, is identical to the blade 38 except that it is bent along a second generally straight line indicated at 62 to provide a planar portion 64 at the free end of the blade 38a which lies at an obtuse angle relative to the planar portion 60. By providing the second bend line 62 and the planar portion 64, the teeth 44 of the edge members 42 are disposed at a better angle for expelling the manure in a more efficient manner.

It will be understood that the expeller blades 38 and 38a of the present invention reduce the torque load and the vibration on the expeller device 26 while it is expelling manure from the spreader 10.

The following claims are intended to cover all modifications and variations of the preferred embodiments of the invention without departing from the spirit and scope of the invention.

Having thus described the invention, what is claimed is:

1. A manure spreader comprising:
   a tank for containing manure, said tank having a front end wall, a rear end wall and side walls;
   an auger mounted in said tank for moving manure toward an opening formed in one of the side walls of said tank;
   expeller means disposed at said opening to throw manure away from said tank;
   said expeller means including a plurality of blades connected to and rotatable about a central shaft;
   each of said blades having a first edge facing toward said front end wall of said tank, a second edge facing toward said rear end wall of said tank, and first and second planar portions disposed between said first and second edges, said first and second planar portions being canted in substantially the same direction toward said rear end wall of said tank and angled in substantially the same direction relative to each other and to the longitudinal axis of said central shaft;
   each of said blades being bent along first and second generally straight lines extending between said first and second edges to provide said first and second planar portions, respectively, in order to cause said expeller means to throw manure in a lateral and rearward direction with respect to the direction of travel of the manure spreader.

* * * * *